United States Patent
Wu et al.

(10) Patent No.: US 12,470,797 B2
(45) Date of Patent: Nov. 11, 2025

(54) OPTICAL ELEMENT DRIVING MECHANISM

(71) Applicant: TDK TAIWAN CORP., Taoyuan (TW)

(72) Inventors: Chia-Che Wu, Taoyuan (TW); Che-Wei Chang, Taoyuan (TW); Yu-Chiao Lo, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 196 days.

(21) Appl. No.: 17/895,300

(22) Filed: Aug. 25, 2022

(65) Prior Publication Data

US 2023/0066834 A1      Mar. 2, 2023

Related U.S. Application Data

(60) Provisional application No. 63/236,861, filed on Aug. 25, 2021.

(51) Int. Cl.
| | |
|---|---|
| H04N 23/57 | (2023.01) |
| G02B 7/04 | (2021.01) |
| G03B 9/36 | (2021.01) |
| H04N 23/51 | (2023.01) |
| H04N 23/54 | (2023.01) |
| H04N 23/55 | (2023.01) |
| H10N 30/20 | (2023.01) |

(52) U.S. Cl.
CPC ............... *H04N 23/57* (2023.01); *G02B 7/04* (2013.01); *G03B 9/36* (2013.01); *H04N 23/51* (2023.01); *H04N 23/54* (2023.01); *H04N 23/55* (2023.01); *H10N 30/20* (2023.02)

(58) Field of Classification Search
CPC ........ H04N 23/51; H04N 23/54; H04N 23/55; H04N 23/57; H10N 30/20; G02B 7/04; G03B 9/36
See application file for complete search history.

(56) References Cited

FOREIGN PATENT DOCUMENTS

| CN | 211741798 U | * | 10/2020 | |
|---|---|---|---|---|
| CN | 212410942 U | * | 1/2021 | |
| CN | 113467042 A | * | 10/2021 | ........... G02B 27/646 |
| JP | 2020190651 A | * | 11/2020 | ........... G02B 7/1805 |

OTHER PUBLICATIONS

Anti-shake Reflection Module, Lens Module, Camera Device and Electronic Equipment (Year: 2021).*
Optical Element Drive Device, Camera Device and Electronic Apparatus (Year: 2021).*

* cited by examiner

*Primary Examiner* — Twyler L Haskins
*Assistant Examiner* — Surafel Yilmakassaye
(74) *Attorney, Agent, or Firm* — Muncy, Geissler, Olds & Lowe, P.C.

(57) ABSTRACT

An optical element driving mechanism is provided. The optical element driving mechanism includes a fixed portion, a movable portion, and a connecting element. The movable portion is movable relative to the fixed portion. The connecting element connects the fixed portion and the movable portion. The connecting position of the fixed portion and the connecting element is closer to the center of the connecting element than the connecting position of the movable portion and the connecting element.

19 Claims, 10 Drawing Sheets

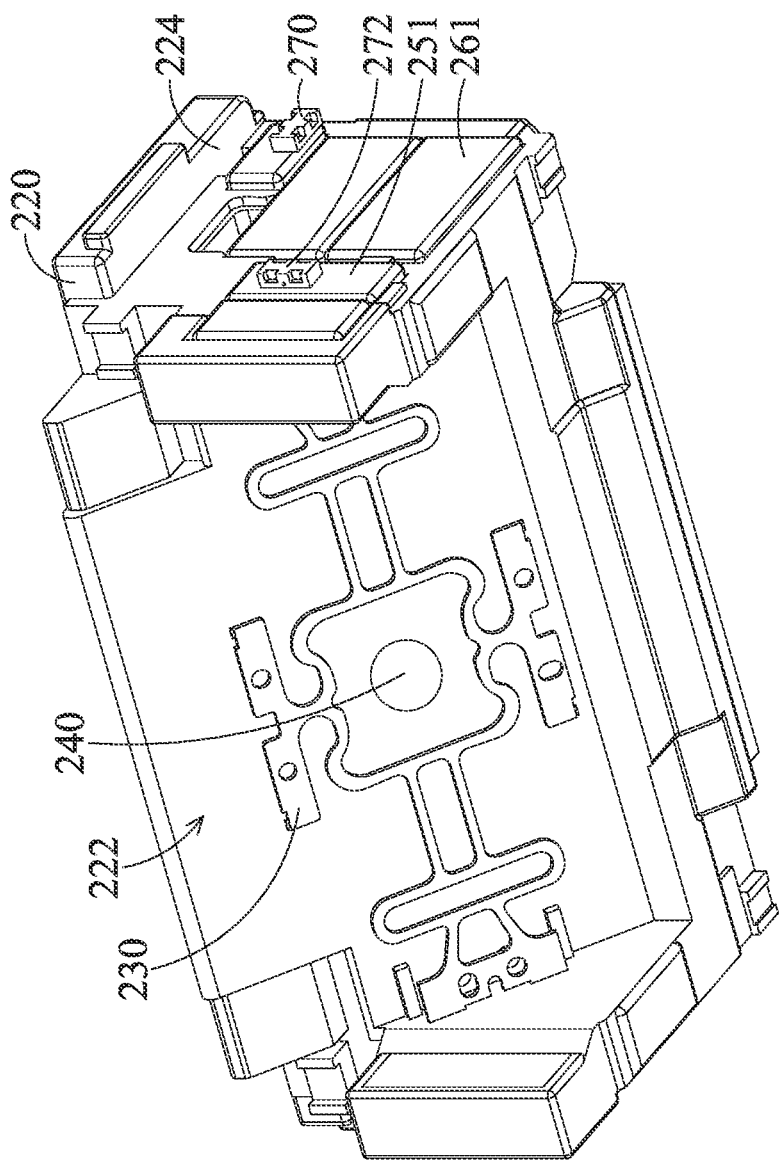
FIG. 10
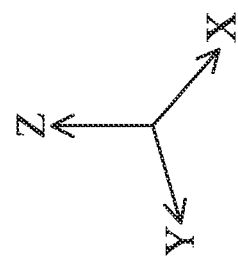

OPTICAL ELEMENT DRIVING MECHANISM

CROSS REFERENCE TO RELATED APPLICATIONS

This application claims the benefit of U.S. Provisional Application No. 63/236,861 filed Aug. 25, 2021 the entirety of which is incorporated by reference herein.

BACKGROUND OF THE INVENTION

Field of the Invention

The present invention relates to an optical element driving mechanism, and, in particular, to an optical element driving mechanism including a plurality of driving assemblies.

Description of the Related Art

Thanks to the rapid development of technology, it has become more common to include image-capturing and video-recording functions into various electronic devices, such as notebook computers, smartphones, and digital cameras. The use of these electronic devices is becoming more and more common. In addition to the models that have been developed to be more convenient, thin, and lightweight, it is also desirable to provide optical qualities that are better and more stable, offering the consumers more choice.

Electronic devices that have image-capturing or video-recording functions normally include one or more lenses, thereby achieving such functions as auto focus (AF), zooming, and optical image stabilization (OIS). Therefore, optical element driving mechanisms often include multiple driving assemblies for driving the optical elements to move. However, conventionally, at least one of the driving assemblies is often disposed in the direction that the light enters or leaves the optical element driving mechanism, leaving too much distance between the center of mass of the overall mechanism and the rotational center (e.g. the fulcrum), causing problems like tilting or deflection. As a result, the present disclosure provides an optical element driving mechanism that is different from the prior art, to allow precise adjustments to the positions of the optical elements while preventing the optical element driving mechanism from tilting or deflecting.

BRIEF SUMMARY OF THE INVENTION

According to some aspect of the present disclosure, an optical element driving mechanism for driving an optical element is provided. The optical element driving mechanism includes a fixed portion, a movable portion, and a connecting element. The movable portion is movable relative to the fixed portion. The connecting element connects the fixed portion and the movable portion, wherein the connecting position of the fixed portion and the connecting element is closer to the center of the connecting element than the connecting position of the movable portion and the connecting element.

In some of the embodiments, the connecting element includes a plurality of connecting portions to balance the movable portion relative to the fixed portion. In some of the embodiments, the connecting position of the fixed portion and the connecting portions is closer to the center of the connecting element than the connecting position of the movable portion and the connecting portions. In some of the embodiments, the connecting element is a spring.

In some of the embodiments, the optical element driving mechanism further includes a supporting element disposed between the movable portion and the fixed portion to provide support when the movable portion is moved relative to the fixed portion. In some of the embodiments, the supporting element is spherical.

In some of the embodiments, the movable portion includes a recess portion, and the supporting element and the connecting element are disposed in the recess portion.

In some of the embodiments, a surface of the supporting element aligns with a surface of the connecting element. In some of the embodiments, a cross-section of the supporting element and a surface of the connecting element are on a same plane.

In some of the embodiments, the connecting element is disposed perpendicular to a light receiving surface of the optical element.

In some of the embodiments, the optical element driving mechanism further includes a first driving assembly and a second driving assembly. The first driving assembly drives the movable portion to perform a first motion relative to the fixed portion. The second driving assembly drives the movable portion to perform a second motion relative to the fixed portion, wherein a direction of the first motion is perpendicular to a direction of the second motion. The first driving assembly and the second driving assembly are disposed on different sides of the movable portion.

In some of the embodiments, the optical element driving mechanism further comprises a sensing element disposed on the same side of the movable portion with the second driving assembly.

In some of the embodiments, the connecting element is disposed at an angle with a light receiving surface of the optical element, the angle being greater than 0 degrees and smaller than 90 degrees. In some of the embodiments, the movable portion includes an optical element bearing portion, which is a flat plate parallel to the connecting element, and the optical element bearing portion is connected with the connecting element.

In some of the embodiments, the optical element driving mechanism further includes a first driving assembly and a second driving assembly. The first driving assembly drives the movable portion to perform a first motion relative to the fixed portion. The second driving assembly drives the movable portion to perform a second motion relative to the fixed portion, wherein the direction of the first motion is perpendicular to the direction of the second motion. The first driving assembly and the second driving assembly are disposed on the same side of the movable portion.

In some of the embodiments, the optical element driving mechanism further includes a sensing element, wherein the second driving assembly, the first driving assembly, and the sensing element are disposed on the same side of the movable portion.

In some of the embodiments, the fixed portion includes a case and a reinforce plate. The edges of the reinforce plate are secured to the case. The movable portion is located in a protection space formed by the reinforce plate and the case. In some of the embodiments, the reinforce plate is secured to the case by welding.

In some of the embodiments, the optical element driving mechanism further includes an electronic assembly. The size of the reinforce plate is greater than the size of the electronic assembly. The reinforce plate is attached to the electronic assembly.

In some of the embodiments, the reinforce plate includes an extending portion that extends from the reinforce plate and is attached to the electronic assembly, supporting the electronic assembly.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 10 is a rear perspective view of the optical element driving mechanism of FIG. 7, with a fixed portion and coils removed, according to some aspects of the present disclosure.

DETAILED DESCRIPTION OF THE INVENTION

Figure 1:
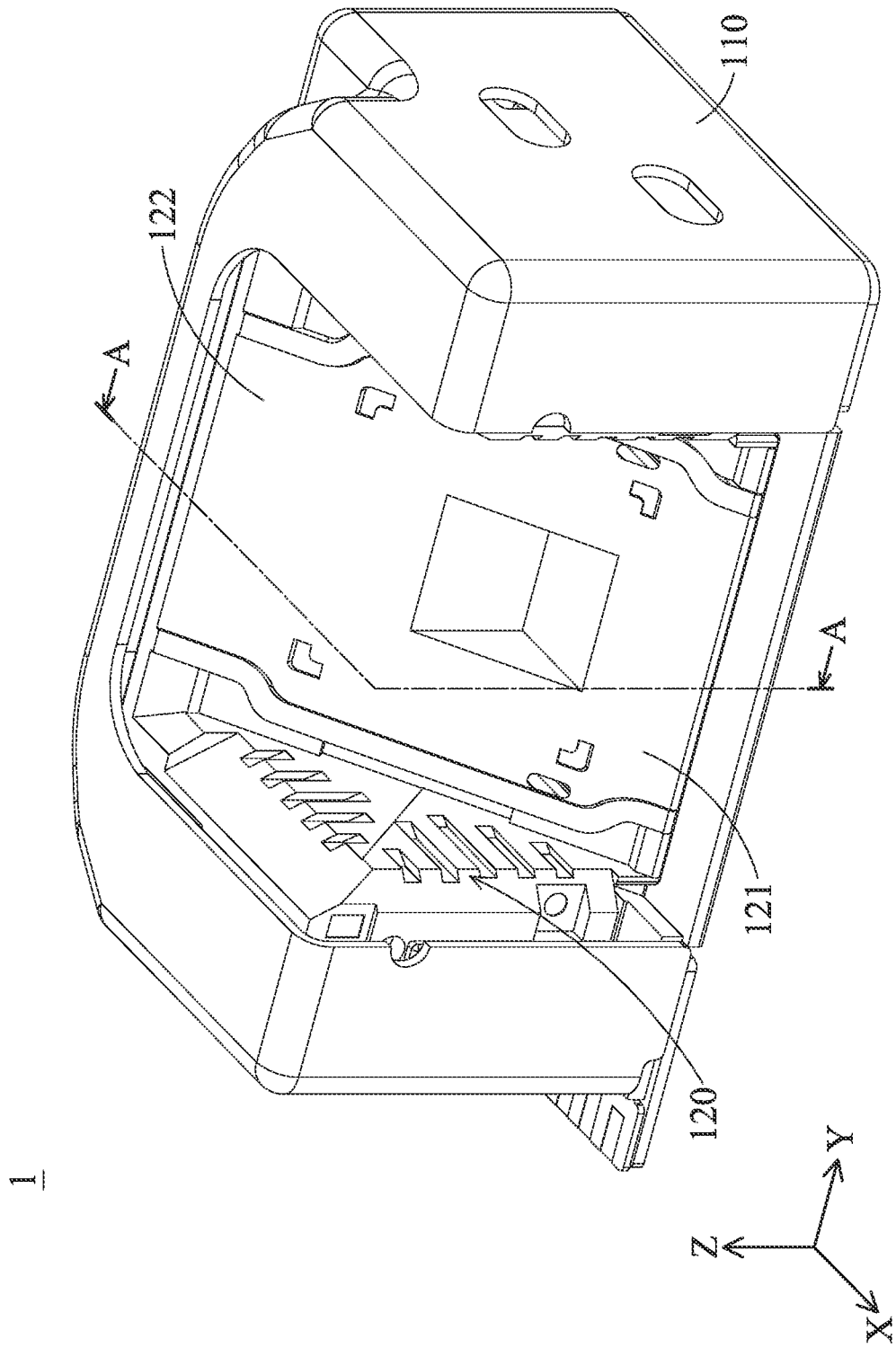
FIG. 1 is a front perspective view of an optical element driving mechanism, according to some aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof.

Figure 2:
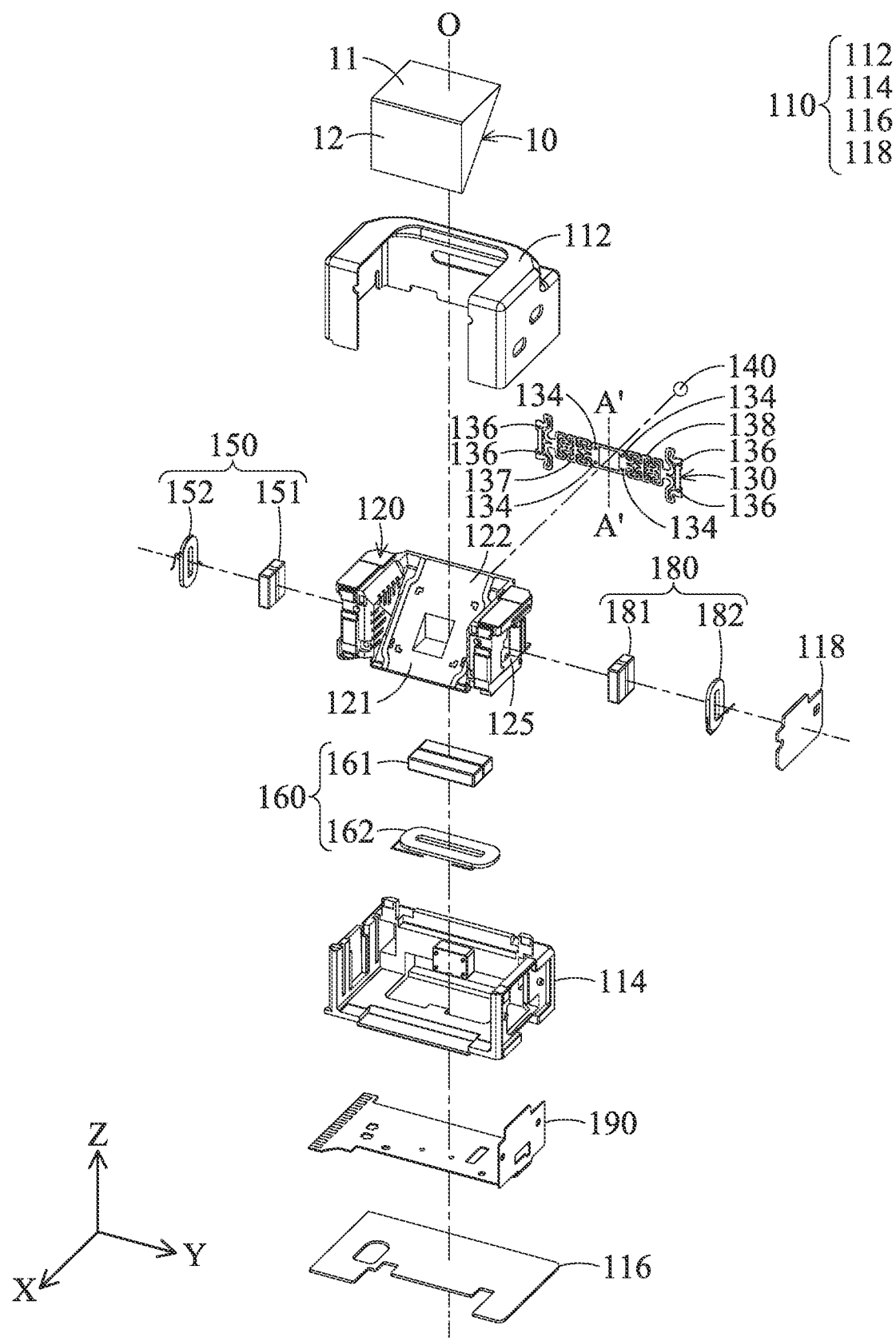
FIG. 2 is an exploded view of the optical element driving mechanism of FIG. 1 and an optical element, according to some aspects of the present disclosure.
Figure 4:
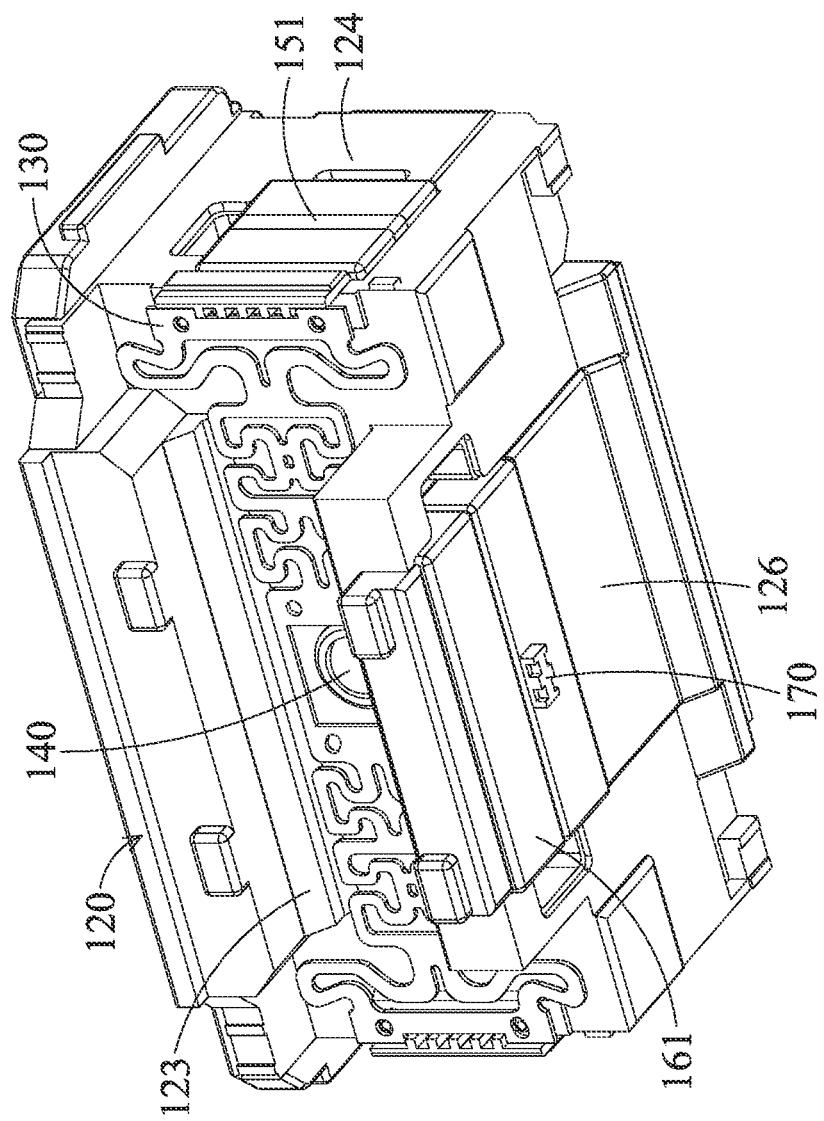
FIG. 4 is a rear perspective view of the optical element driving mechanism of FIG. 1, with a fixed portion and coils removed, according to some aspects of the present disclosure.

Referring to FIG. 1 and FIG. 2, FIG. 1 illustrates a front perspective view of an optical element driving mechanism 1, according to certain aspects of the present disclosure. FIG. 2 illustrates an exploded view of the optical element driving mechanism 1 of FIG. 1 and an optical element 10, according to certain aspects of the present disclosure. The optical element driving mechanism 1 drives the optical element 10, and includes a fixed portion 110, a movable portion 120, a connecting element 130, a supporting element 140, a first driving assembly 150, a second driving assembly 160, and a sensing element 170 (as shown in FIG. 4), a third driving assembly 180, and an electronic assembly 190. The fixed portion 110 includes a case 112, a bearing seat 114, a reinforce plate 116, and a reinforcement plate 118.

The movable portion 120 rotates relative to the fixed portion 110 with the supporting element 140 as a fulcrum, and the movable portion 120 includes an optical element bearing portion 122 connected with the connecting element 130. The connecting element 130 connects the fixed portion 110 and the movable portion 120. As shown in FIG. 1, the optical element driving mechanism 1 is generally a rectangular parallelepiped, exposing the movable portion 120 and an inclined surface 121 of the optical element bearing portion 122 facing the optical element 10.

Figure 3:
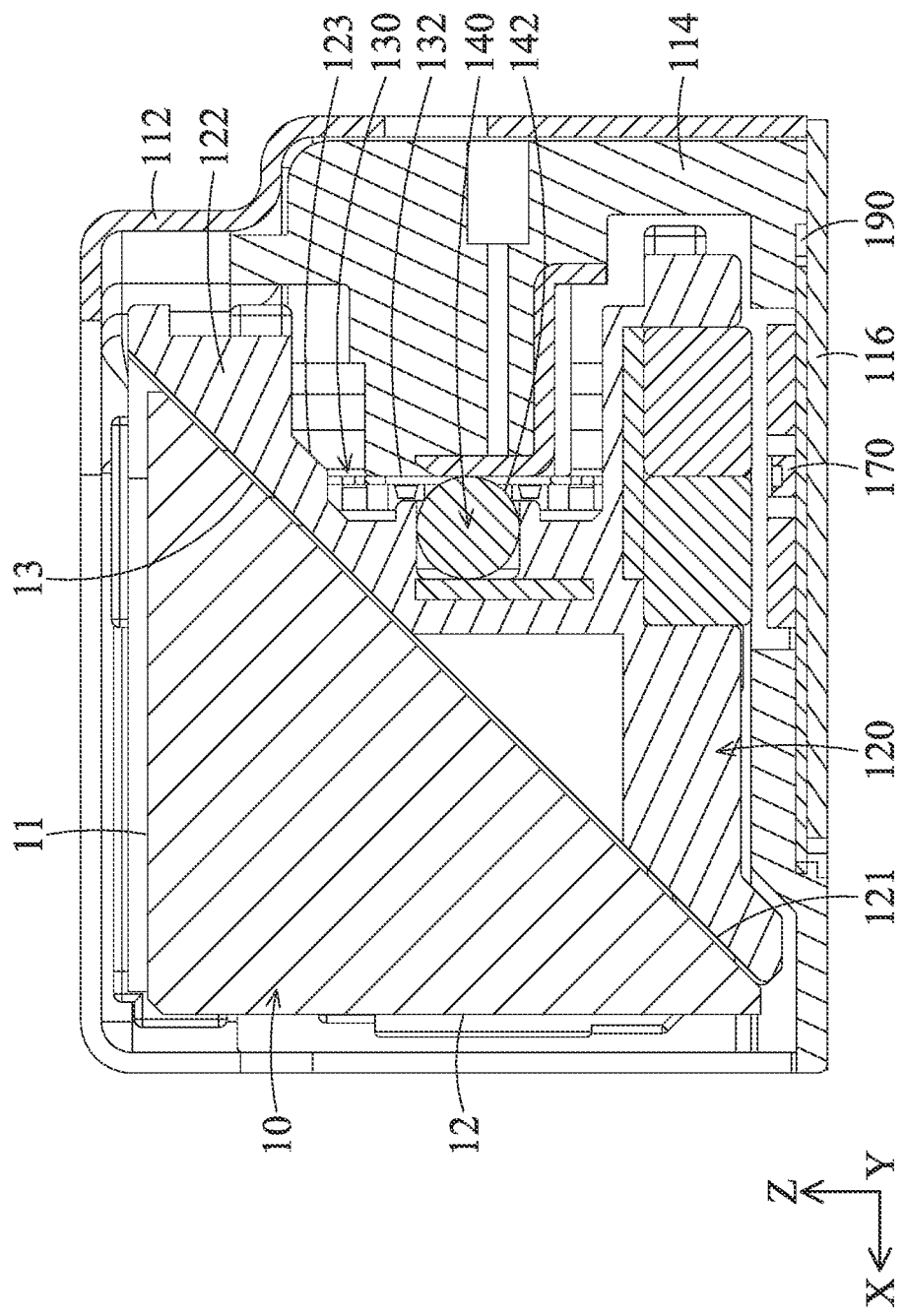
FIG. 3 is a cross-sectional view of the optical element driving mechanism of FIG. 1 and an optical element taken across line A-A, according to some aspects of the present disclosure.

Please refer to FIG. 2 as well as FIG. 3. FIG. 3 is a cross-sectional view of the optical element driving mechanism 1 and the optical mechanism 10 taken across line A-A, according to some aspects of the present disclosure. The optical element 10 has an optical axis O, and includes a light receiving surface 11, a light-emitting surface 12, and a reflecting surface 13. The optical element 10 is fixedly connected to the movable portion 120, thereby the optical element 10 moves relative to the fixed portion 110 together with the movable portion 120 to obtain the desired optical effect. The optical element 10 may be, for example, a prism that has the function of changing the traveling direction of the light. In the embodiment shown in FIG. 2, the light receiving surface 11 is the surface through which light passes when entering the optical element driving mechanism 1, and is perpendicular to the optical axis O. The light-emitting surface 12 is a surface through which light passes when leaving the optical element driving mechanism 1, and is perpendicular to the light incident surface 11. The reflecting surface 13 of the optical element 10 is parallel to the inclined surface 121, and through the optical properties of the optical element 10, the light reaches the reflecting surface 13 and changes its traveling direction to obtain the desired optical effect. In some embodiments, the light enters the optical element driving mechanism 1 through the light receiving surface 11 along the optical axis O, changes the traveling direction (for example, from the Z direction to the X direction) via the reflective surface 13, and then exits the optical element driving mechanism 1 through the light-emitting surface 12.

The optical element bearing portion 122 has a recess portion 123 (shown in FIG. 3) on a side opposite to the inclined surface 121, and the supporting element 140, or the connecting element 130, or both the supporting element 140 and the connecting element 130 are disposed in the recess portion 123. The recess portion 123 may be designed as any structure depending on the requirements or other limitations in the process. In the embodiment shown in FIG. 3, the recess portion 123 has a step structure; the supporting element 140 is disposed in a deeper portion of the recess portion 123, which means the supporting element 140 is at a position closer to the light-emitting surface 12. The connecting element 130 is disposed in a shallower portion of the recess portion 123. Since the entire center of mass of the movable portion 120 is close to the optical element 10, such arrangement effectively makes sure that the rotational center of the rotational motion of the movable portion 120 relative to the fixed portion 110 is closer to the overall center of mass of the movable portion 120. Therefore, deflection or tilting will not occur when the movable portion 120 is not powered on under the influence of gravity or the restoring force provided by the connecting element 130. The size of the optical element driving mechanism 1 in the X direction is reduced due to the arrangement of the recess portion 123. This increases the stability of the mechanism while at the same time achieving miniaturization.

The connecting element 130, which connects the fixed portion 110 and the movable portion 120, is designed as a shape that matches the recess portion 123, and is perpendicular to the light receiving surface 11 of the optical element 10. i.e., parallel to the light-emitting surface 12. The connecting element 130 may be an elastic element, a spring, a reed, etc., to provide a restoring force for the movement of the movable portion 120 relative to the fixed portion 110. The connecting element 130 has four first connecting positions 134 and four second connecting positions 136, wherein the first connecting positions 134 are closer to a center 135 of the connecting element 130 than the second connecting positions 136 (can be seen clearly in FIG. 6). That is, the distance between the first connecting positions 134 and the center 135 of the connecting element 130 is smaller than the distance between the second connecting positions 136 and the center 135 of the connecting element 130.

Please refer to FIG. 2 and FIG. 3. The connecting element 130 is connected to the fixed portion 110 at the first connecting positions 134 and is connected to the movable portion 120 at the second connecting positions 136. The connecting positions of the connecting element 130 and the fixed portion 110 is closer to the center 135 of the connecting element 130 than the connecting positions of the connecting element 130 and the movable portion 120. Therefore, the first connection positions 134 are closer to the center 135 of the connecting element 130 in the Z direction, providing the connecting element 130 and the supporting element 140 more space for arrangement in the X direction. Since the overall center of mass of the movable portion 120 is close to the optical element 10, arranging the connecting element 130 and the supporting element 140 closer to the optical element 10 in the X direction locates the rotational center (i.e., the fulcrum) closer to the overall center of mass of the movable portion 120. The rotational center is the rotational center of the rotational motion of the movable portion 120 relative to the fixed portion 110. Therefore, deflection or tilting will not occur when the movable portion 120 is not powered on under the influence of gravity or the restoring force provided by the connecting element 130. The size of the optical element driving mechanism 1 in the X direction is reduced. This increases the stability of the mechanism while at the same time achieving miniaturization.

The connecting element 130 is an entire piece, and may be divided into two connecting portions 137 and 138 by the dotted line A'-A' in FIG. 2. Each of the connecting positions of the connecting portions 137 and 138 and the fixed portion 110 is closer to the center 135 of the connecting element 130 than each of the connecting positions of the connecting portions 137 and 138 and the movable portion 120. When the mechanism is not powered on and one of the connecting portions 137 and 138 is impacted by gravity or external force, the restoring force of the other one of the connecting portions 137 and 138 restrain the movement of the connecting portion impacted by gravity or external force. This further restrains the deflection or tilting of the movable portion 120, achieving a balance of the movable portion 120 relative to the fixed portion 110. In some of the other embodiments, the connecting element 130 may include a plurality of separate connecting portions (e.g., two, four, six, etc.), and is not limited to an entire piece.

Next, please refer to FIG. 3. The supporting element 140 is disposed between the movable portion 120 and the fixed portion 110 to provide support when the movable portion 120 moves relative to the fixed portion 110. The supporting element 140 is spherical, so that supporting element 140 provides stable support when the movable portion 120 moves relative to the fixed portion 110 in various directions, and makes the motion process smoother.

As shown in FIG. 3, in some embodiments, a surface 142 of the supporting element 140 aligns with a plane extending from a surface 132 facing away from the optical element 10 in the X direction of the connecting element 130.

Referring to FIG. 2 again, the first driving assembly 150 includes a first magnetic element 151 and a first coil 152. The electromagnetic driving force generated between the first coil 152 and the first magnetic element 151 drives a first motion performed by the movable portion 120 relative to the fixed portion 110. The second driving assembly 160 includes a second magnetic element 161 and a second coil 162. The electromagnetic driving force generated between the second coil 162 and the second magnetic element 161 drives a second motion performed by the movable portion 120 relative to the fixed portion 110. The third driving assembly 180 includes a third magnetic element 181 and a third coil 182. The electromagnetic driving force generated between the third coil 182 and the third magnetic element 181 drives a third motion performed by the movable portion 120 relative to the fixed portion 110.

Please refer to FIG. 2 and FIG. 4 together. FIG. 4 is a rear perspective view of the optical element driving mechanism 1, with the fixed portion 110 and the first coil 152, the second coil 162, and the third coil 182 removed, according to some aspects of the present disclosure. The first motion of the movable portion 120 is a rotational motion of the movable portion 120 parallel to the Z direction. The second motion of the movable portion 120 is the rotational motion of the movable portion 120 parallel to the Y direction. The direction of the first motion is perpendicular to the direction of the second motion. The direction of the third movement mentioned above is parallel to the direction of the first movement. In some embodiments, the first driving assembly 150 is disposed on a first side 124 of the movable portion 120 along the Y direction, and the second driving assembly 160 is disposed on a second side 126 of the movable portion 120 along the Z direction. The third driving assembly 180 is disposed on a side 125 opposite to the first side 124 of the movable portion 120 along the Y direction. The sensing element 170, which is used for sensing the displacement and/or rotation of the movable portion 120 when the movable portion 120 moves, is disposed on the second side 126 of the movable portion 120 together with the second driving assembly 160.

Figure 5:
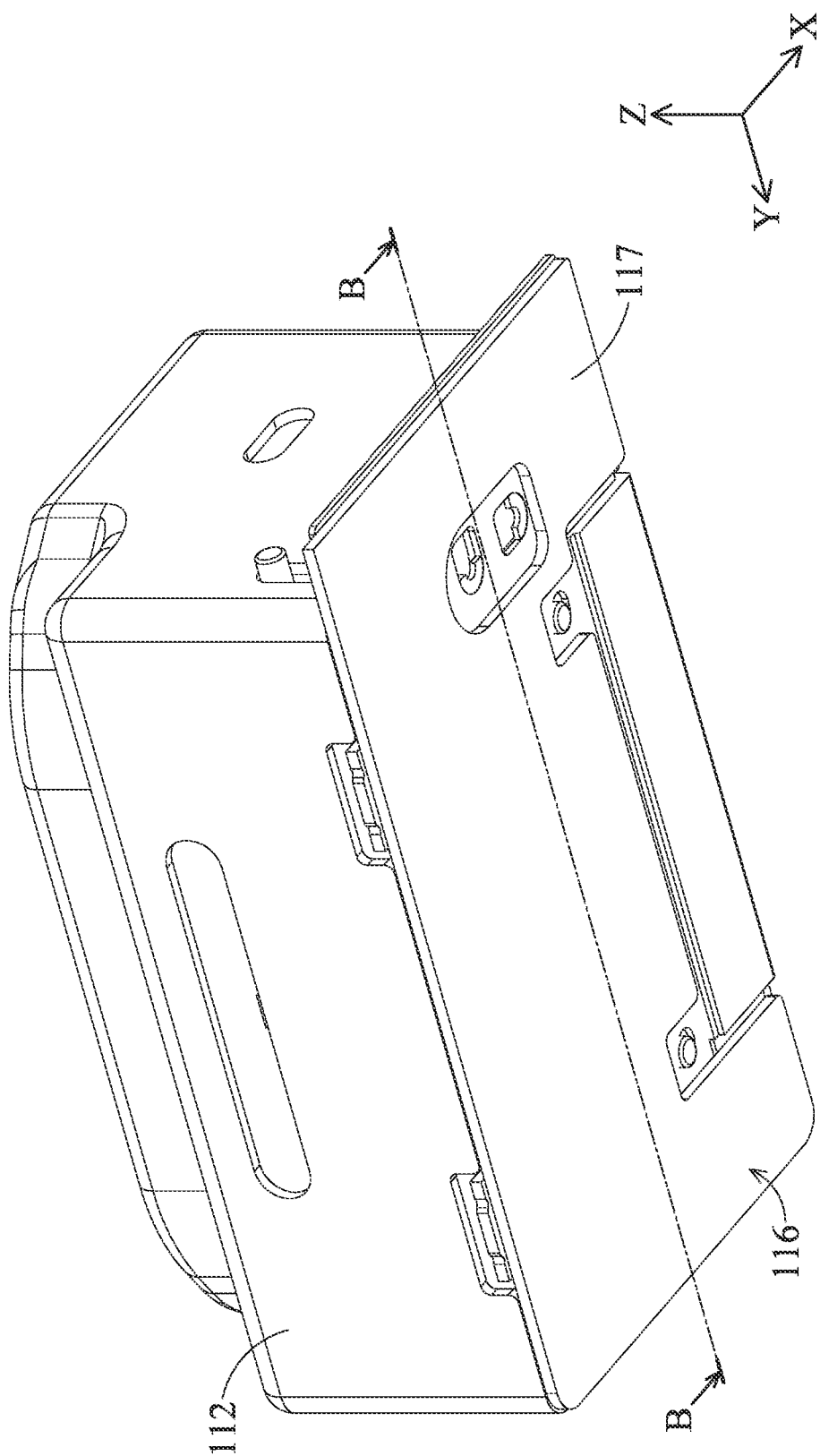
FIG. 5 is a rear perspective view of the optical element driving mechanism of FIG. 1, according to some aspects of the present disclosure.
Figure 6:
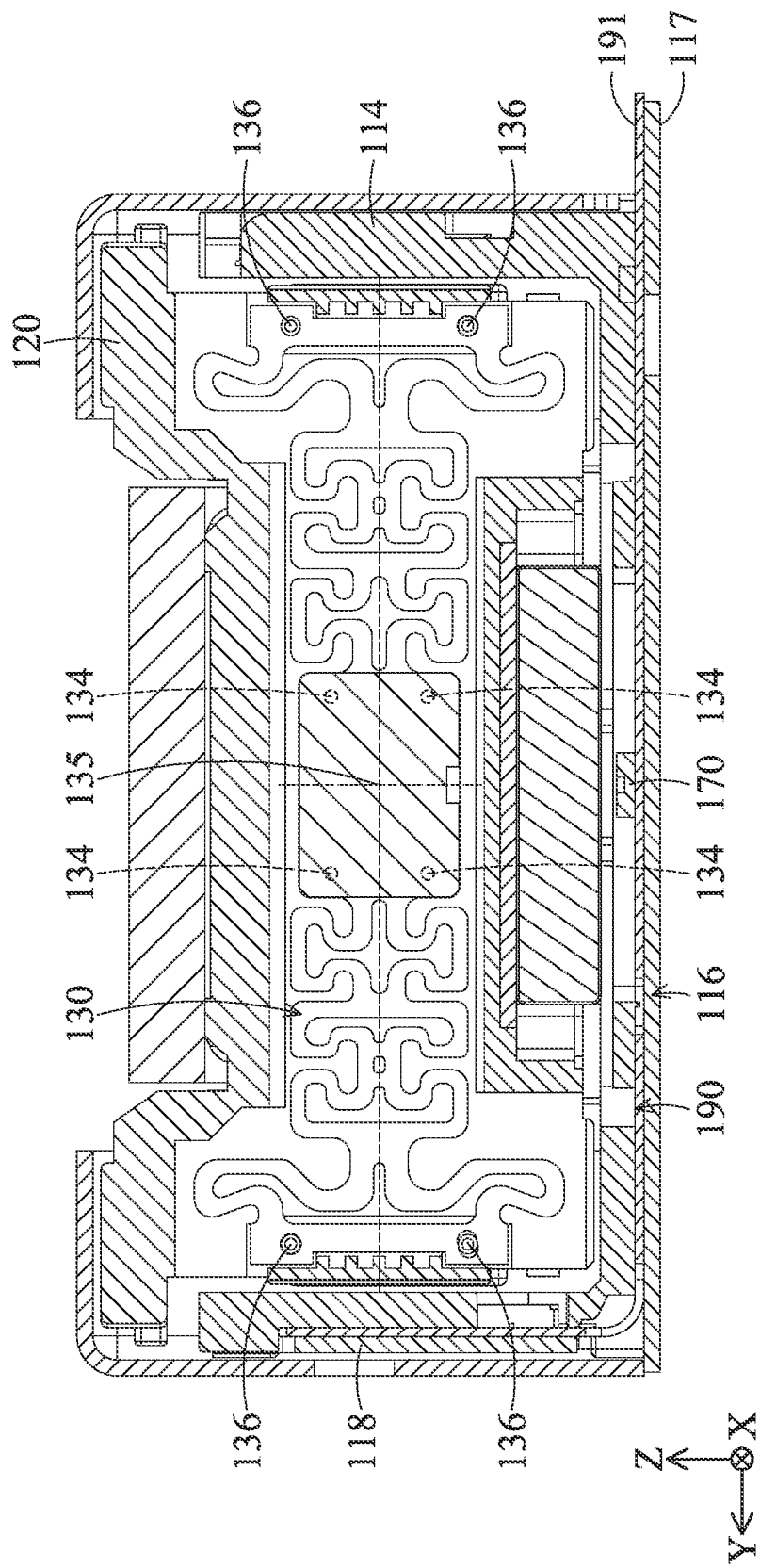
FIG. 6 is a cross-sectional view of the optical element driving mechanism of FIG. 5 taken across line B-B, according to some aspects of the present disclosure.

Next, please refer to FIG. 2, FIG. 5, and FIG. 6 together. FIG. 5 illustrates a rear perspective view of the optical element driving mechanism 1, according to some aspects of the present disclosure. FIG. 6 illustrates a cross-sectional view of the optical element driving mechanism 1 taken across line B-B, according to some aspects of the present disclosure. The edges of the reinforce plate 116 are secured to the case 112 by, for example, welding to form a protective space. The elements of the optical element driving mechanism 1 (the bearing seat 114, the movable portion 120, the connecting element 130, the supporting element 140, the first driving assembly 150, the second driving assembly 160, the sensing element 170, and the third driving assembly 180) are accommodated in the protection space to effectively prevent dust and interference from external environment.

The electronic assembly 190 may be, for example, a flexible printed circuit board, which is connected to the first driving assembly 150, the second driving assembly 160, and the third driving assembly 180. Through an external controlling assembly (not shown in FIGS.), the driving signals are input to each driving assembly to achieve controlling the motion of the movable portion 120. In some embodiments, the reinforce plate 116 has a larger size than the electronic assembly 190, and the reinforce plate 116 is attached to the electronic assembly 190. The reinforce plate 116 encloses most of the electronic assembly 190 in the protective space, and strengthen the bottom structure of the electronic assembly 190 by attaching, so that the electronic assembly 190 does not deform easily.

The electronic assembly 190 includes a connecting portion 191 extending from the electronic assembly 190 to the outside of the protective space. In some embodiments, the reinforce plate 116 includes an extending portion 117 that extends from the reinforce plate 116 and attaches to the connecting portion 191, to strengthen the bottom structure of the connecting portion 191 and to support the weight of the connecting portion 191 so that the connecting portion 191 will not be easily deformed by external forces.

The reinforcement plate 118 is disposed between the electronic assembly 190 and the case 112, and is attached to the electronic assembly 190 to strengthen the structure of the electronic assembly 190, so that will not be easily deformed by external force.

Figure 7:
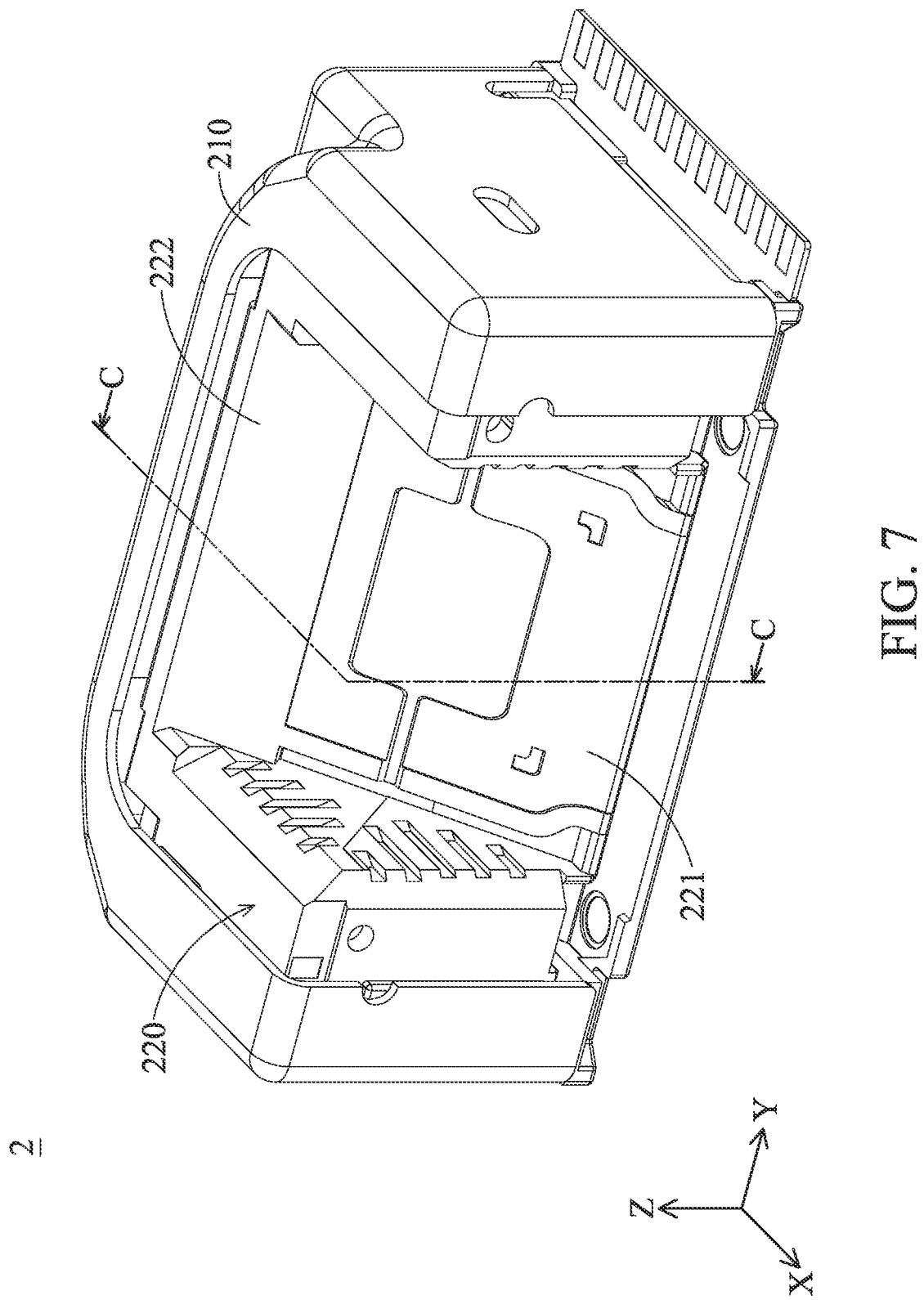
FIG. 7 is a front perspective view of an optical element driving mechanism, according to some aspects of the present disclosure.
Figure 8:
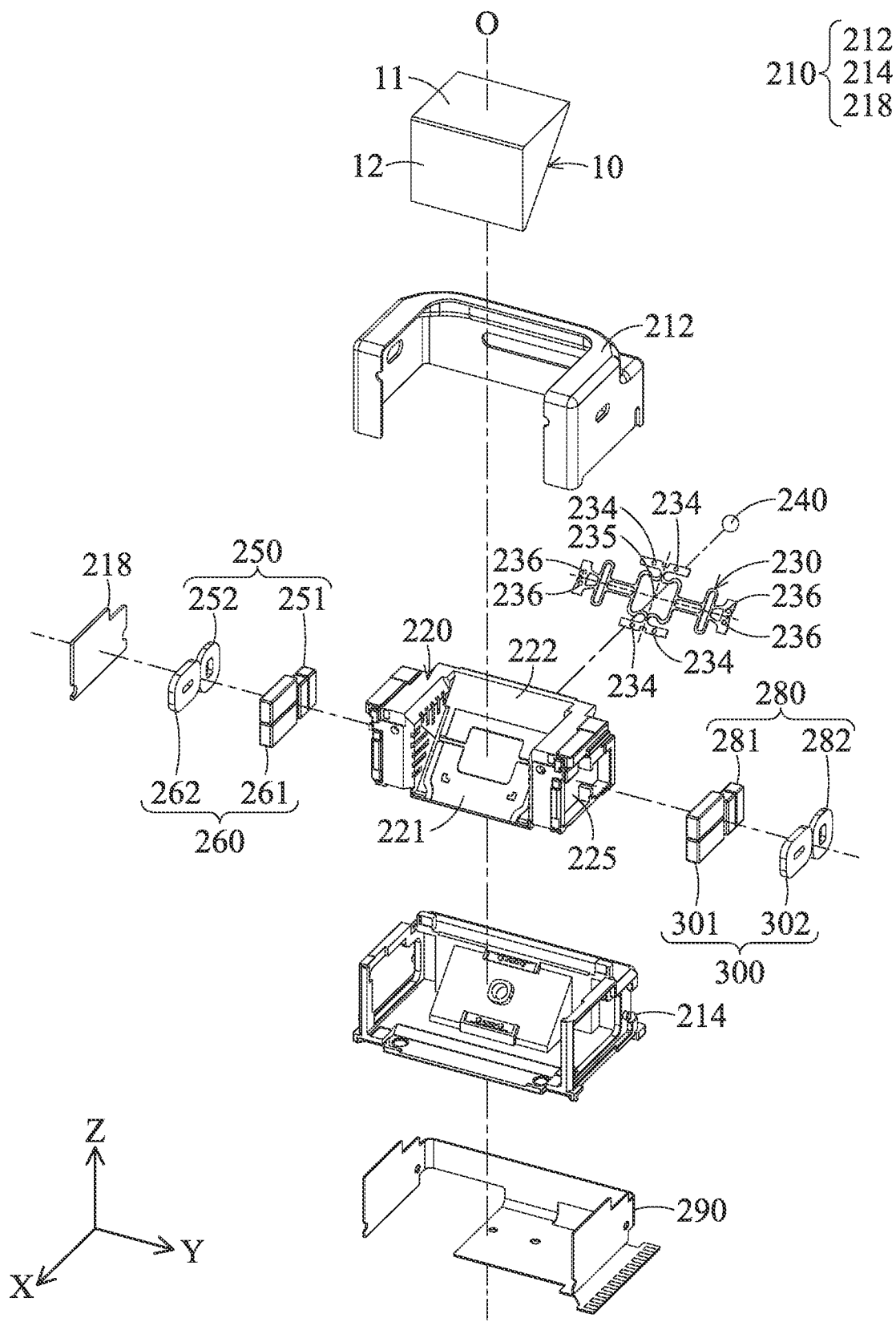
FIG. 8 is an exploded view of the optical element driving mechanism of FIG. 7 and an optical element, according to some aspects of the present disclosure.

Please refer to FIG. 7 and FIG. 8 together. FIG. 7 illustrates a front perspective view of an optical element driving mechanism 2, according to another embodiment of the present disclosure. FIG. 8 illustrates an exploded view of the optical element driving mechanism 2 of FIG. 7 and an optical element 10, according to another embodiment of the present disclosure. The optical element driving mechanism 2 of FIG. 7 is similar to the optical element driving mechanism 1 of FIG. 1, except for some of the elements particularly mentioned below, the reference numbers of similar elements are represented by the same tens digit and units digit. The optical element driving mechanism 2 includes a fixed portion 210, a movable portion 220, a connecting element 230, a supporting element 240, a first driving assembly 250, a second driving assembly 260, and a sensing element 270 (as shown in FIG. 10), a third driving assembly 280, an electronic assembly 290, and a fourth driving assembly 300.

The fixed portion 210 includes a case 212, a bearing seat 214, and a reinforcement plate 218. In the embodiment shown in FIG. 8, the fixed portion 210 does not include a reinforce plate similar to reinforce plate 116, but a reinforce plate may also be provided if required.

Figure 9:
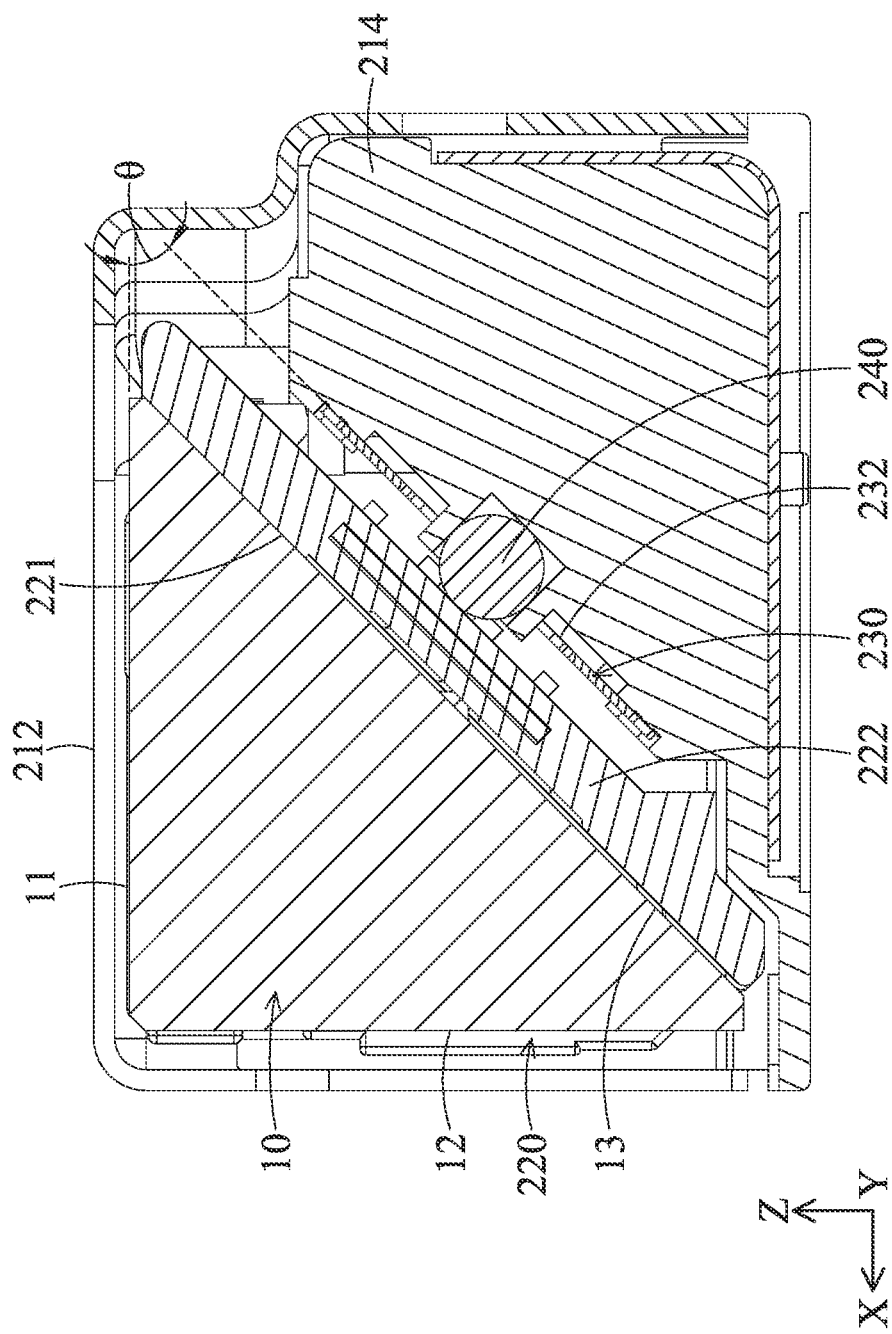
FIG. 9 is a cross-sectional view of the optical element driving mechanism of FIG. 7 and an optical element taken across line C-C, according to some aspects of the present disclosure.

Then referring to FIG. 7 to FIG. 9 together. FIG. 9 illustrates a cross-sectional view of the optical element driving mechanism 2 of FIG. 7 and the optical element 10 taken across line C-C, according to another embodiment of the present disclosure. The optical element bearing portion 222 of the movable portion 220 is a flat plate and is disposed parallel to the connecting element 230 and connected with the connecting element 230.

The connecting element 230 has a different shape from the shape of the connecting element 130. In the embodiment of FIG. 2, the shape of the connecting element 130 is designed to fit the recess portion 123 of the optical element bearing portion 122, while in the embodiment of FIG. 8, the shape of the connecting element 230 is designed to fit the plate structure of the optical element bearing portion 222. The connecting element 230 connects the fixed portion 210 and the movable portion 220. The connecting element 230 is disposed at an angle θ with the light receiving surface 11 of the optical element 10 (i.e., the optical element bearing portion 222 is also disposed at an angle θ with the light receiving surface 11 of the optical element 10). The angle θ is greater than 0 degrees and less than 90 degrees.

One cross-section of the cross-sections of the supporting element 240 is on the same plane as a surface 232 of the connecting element 230. In the embodiment illustrated in FIG. 9, the center of the supporting element 240 overlaps the center 235 of the connecting element 230 (FIG. 8).

Next, please refer to FIG. 8 and FIG. 10 together. FIG. 10 illustrates a rear perspective view of the optical element driving mechanism 2, with fixed portion 210 and the first coil 252, the second coil 262 and the third coil 282 removed, according to some aspects of the present disclosure. The first driving element 250 is disposed on a first side 224 of the movable portion 220 along the Y direction. The electromagnetic driving force generated between the first coil 252 and the first magnetic element 251 of the first driving element 250 drives a first motion performed by the movable portion 220 relative to the fixed portion 210. The first motion is a rotational motion parallel to the Z direction.

The second driving element 260 is also disposed on the first side 224 of the movable portion 220, and the position of the second driving element 260 is different from that of the driving element 160. The electromagnetic driving force generated between the second coil 262 and the second magnetic element 261 of the second driving element 260 drives a second motion performed by the movable portion 220 relative to the fixed portion 210. The second motion is a rotational motion parallel to the Y direction.

The sensing element 270 is disposed on the first side 224 of the movable portion 220 together with the first driving assembly 250 and the second driving assembly 260. The optical element driving mechanism 2 further includes another sensing element 272, which may be disposed on the first side 224 or the opposite side 225 of the movable portion 220.

The third driving assembly 280 is disposed on the side 225 that is opposite to the first side 224 of the movable portion 220 along the Y direction. The electromagnetic driving force generated between the third coil 282 and the third magnetic element 281 of the third driving element 280 drives a third motion performed by the movable portion 220 relative to the fixed portion 210. The direction of the third motion is parallel to the direction of the first motion.

The fourth driving assembly 300 is also disposed on the opposite side 225 of the movable portion 220, and includes a fourth coil 302 and a fourth magnetic element 301. The electromagnetic field generated between the fourth coil 302 and the fourth magnetic element 301 drives the movable portion 220 to perform a fourth motion relative to the fixed portion 210. The direction of the fourth motion is parallel to the direction of the second motion.

The arrangements of the connecting element 230, the supporting element 240, the flat plate structure of the optical bearing portion 222, the driving assemblies 250, 260, 280, 300 and the sensing elements 270, 272 shortens the distance between the fulcrum and the overall center of mass of the movable portion 220 so that the driving is more stable and precise. Since the distance between the fulcrum and the overall center of mass of the movable portion 220 in the X direction, the size of the optical element driving mechanism 2 in the X direction is reduced, and the miniaturization of the mechanism is achieved.

The present invention provides an optical element driving mechanism, including a fixed portion, a plurality of driving assemblies, a movable portion that performs rotational motion, a connecting element, and a supporting element as a fulcrum of the rotational motion. In the configuration provided by the present disclosure, the overall center of mass of the driving assembly and the movable portion is close to the position where the supporting element is located. By altering the arrangements of the connecting element and the movable portion, when the movable portion is not power on, deflection or tilting due to the influence of gravity or external force impact is less likely to happen.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above-described examples. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

What is claimed is:

1. An optical element driving mechanism for driving an optical element, the optical element driving mechanism comprising:
    a fixed portion;
    a movable portion movable relative to the fixed portion;
    a connecting element connecting the fixed portion and the movable portion, wherein the connecting position of the fixed portion and the connecting element is closer to the center of the connecting element than the connecting position of the movable portion and the connecting element; and
    a supporting element, disposed between the movable portion and the fixed portion to provide support when the movable portion is moved relative to the fixed portion, wherein the distance between the supporting element and a light-emitting surface of the optical element is smaller than the distance between the light-emitting surface and the center of the connecting element;
    the movable portion is movable inside the fixed portion; and
    the connecting element connects the fixed portion and the movable portion inside the fixed portion.

2. The optical element driving mechanism as claimed in claim 1, wherein the connecting element includes a plurality of connecting portions to balance the movable portion relative to the fixed portion.

3. The optical element driving mechanism as claimed in claim 2, wherein the connecting position of the fixed portion and the connecting portions is closer to the center of the connecting element than the connecting position of the movable portion and the connecting portions.

4. The optical element driving mechanism as claimed in claim 1, wherein the connecting element is a spring.

5. The optical element driving mechanism as claimed in claim 1, wherein the supporting element is spherical.

6. The optical element driving mechanism as claimed in claim 1, wherein the movable portion includes a recess portion, and the supporting element and the connecting element are disposed in the recess portion.

7. The optical element driving mechanism as claimed in claim 1, wherein a surface of the supporting element aligns with a surface of the connecting element.

8. The optical element driving mechanism as claimed in claim 1, wherein a cross-section of the supporting element and a surface of the connecting element are on a same plane.

9. The optical element driving mechanism as claimed in claim 1, wherein the connecting element is disposed perpendicular to a light receiving surface of the optical element.

10. The optical element driving mechanism as claimed in claim 9, further comprising:
    a first driving assembly driving the movable portion to perform a first motion relative to the fixed portion; and
    a second driving assembly driving the movable portion to perform a second motion relative to the fixed portion, wherein a direction of the first motion is perpendicular to a direction of the second motion, and the first driving assembly and the second driving assembly are disposed on different sides of the movable portion.

11. The optical element driving mechanism as claimed in claim 10, further comprising a sensing element disposed on the same side of the movable portion with the second driving assembly.

12. The optical element driving mechanism as claimed in claim 1, wherein the connecting element is disposed at an angle with a light receiving surface of the optical element, the angle being greater than 0 degrees and smaller than 90 degrees.

13. The optical element driving mechanism as claimed in claim 12, wherein the movable portion comprises an optical element bearing portion, which is a flat plate parallel to the connecting element, and the optical element bearing portion is connected with the connecting element.

14. The optical element driving mechanism as claimed in claim 12, further comprising:
- a first driving assembly driving the movable portion to perform a first motion relative to the fixed portion; and
- a second driving assembly driving the movable portion to perform a second motion relative to the fixed portion, wherein
- the direction of the first motion is perpendicular to the direction of the second motion, and the first driving assembly and the second driving assembly are disposed on the same side of the movable portion.

15. The optical element driving mechanism as claimed in claim 14, further comprising a sensing element, wherein the second driving assembly, the first driving assembly, and the sensing element are disposed on the same side of the movable portion.

16. The optical element driving mechanism as claimed in claim 1, wherein the fixed portion includes a case and a reinforce plate, edges of the reinforce plate are secured to the case, and the movable portion is located in a protection space formed by the reinforce plate and the case.

17. The optical element driving mechanism as claimed in claim 16, wherein the reinforce plate is secured to the case by welding.

18. The optical element driving mechanism as claimed in claim 16, further comprising an electronic assembly, wherein the size of the reinforce plate is greater than the size of the electronic assembly, and the reinforce plate is attached to the electronic assembly.

19. The optical element driving mechanism as claimed in claim 18, wherein the reinforce plate comprises an extending portion extending from the reinforce plate, and attached to the electronic assembly to support the electronic assembly.

* * * * *